Oct. 5, 1943. H. Y. CARPENTER 2,331,174
CAR TRUCK
Filed May 23, 1941
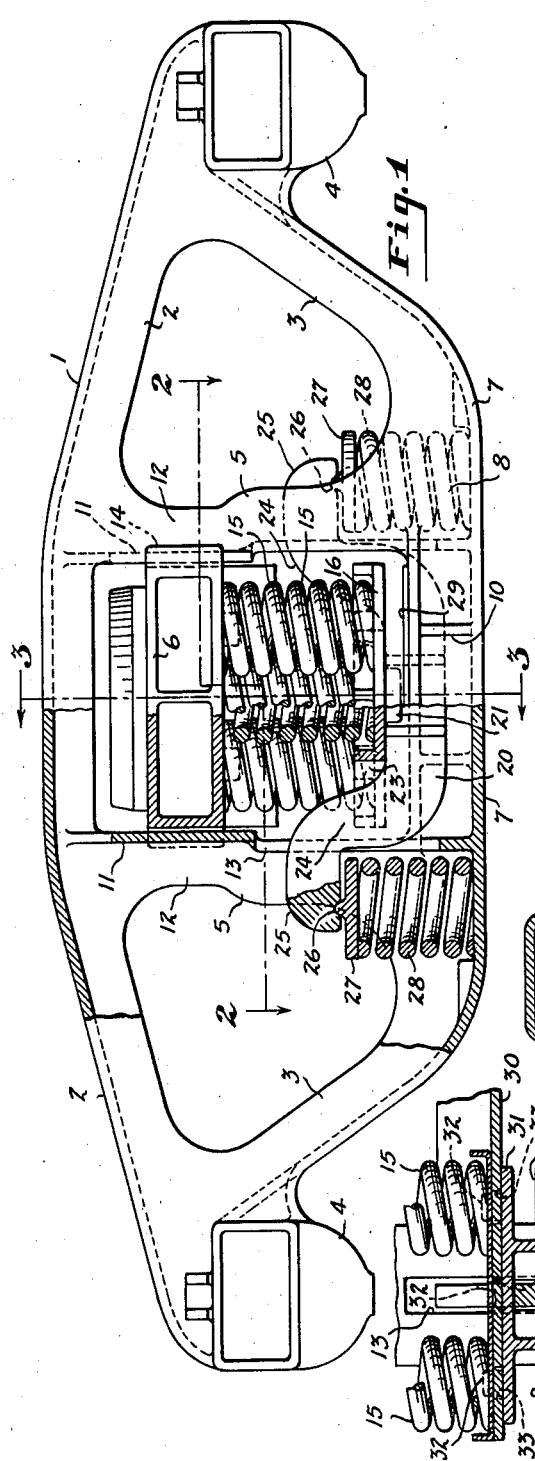
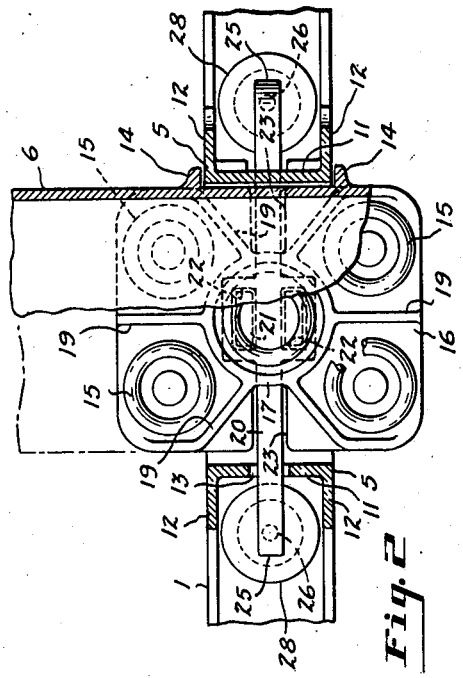
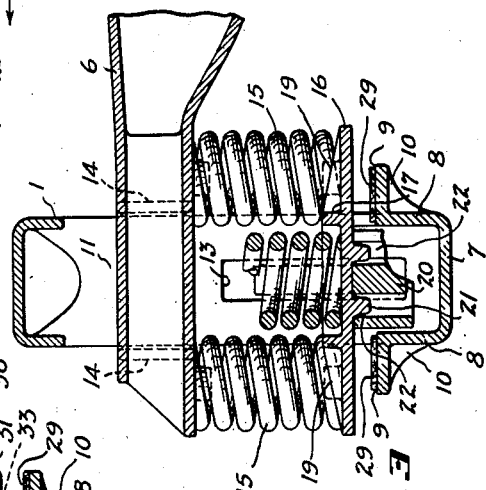
INVENTOR
*Harold Y. Carpenter*
BY
Evans & McCoy
ATTORNEYS Patented Oct. 5, 1943

2,331,174

UNITED STATES PATENT OFFICE 2,331,174

CAR TRUCK

Harold Y. Carpenter, Davenport, Iowa, assignor, by mesne assignments, to McConway & Torley Corporation, Pittsburgh, Pa., a corporation of Pennsylvania Application May 23, 1941, Serial No. 394,831

6 Claims. (Cl. 105—197)

This invention relates to railway car trucks, and more particularly to trucks for freight service of the type in which the bolster is supported upon cushioning springs which are interposed between the ends of the bolster and the side frames.

The railroads have experienced considerable difficulty on account of the rough riding qualities of freight cars when carrying light loads because of the fact that truck springs are of necessity designed to carry the heaviest load for which the car is intended, and for this reason are much too stiff to effectively cushion a light load. In general freight service this problem is serious because the railroads must reimburse the shipper for goods damaged. It is not practical to supply cars of greatly varying spring capacity for use in such service because a car provided with light springs would be unsuitable for carrying heavy loads. Furthermore, such a car would be damaged if it should be loaded heavily. It has been quite well established that the "softness" of the ride given a load is a direct function of the deflection of the truck springs under static load. In other words, the greater the deflection the "softer" the ride. On the other hand, too much deflection cannot be provided because of the limitations imposed by coupler heights.

It is the primary object of the present invention to provide a freight car truck which is suitable for heavy loads and which is also capable of effectively cushioning very light loads.

A further object of my invention is to provide a truck in which an increased spring deflection is provided but in which the movement of the bolster does not exceed the limitations imposed by the couplers.

With the above and other objects in view the invention may be said to comprise the truck as illustrated in the accompanying drawing hereinafter described and particularly set forth in the appended claims, together with such varations and modifications thereof as will be apparent to one skilled in the art to which the invention pertains.

Reference should be had to the accompanying drawing forming a part of this specification, in which:

Figure 1 is a side elevation of a truck embodying the invention, portions of the side frame, bolster and bolster supporting elements being broken away and shown in section;

Fig. 2 is a section taken on the line indicated at 2—2 in Fig. 1;

Fig. 3 is a section taken on the line indicated at 3—3 in Fig. 1; and

Fig. 4 is a fragmentary transverse section showing a slightly modified construction.

Since the side frames of the truck and the supports for the opposite ends of the bolster are identical, the accompanying drawing shows the construction at one side of the truck only, it being understood that this construction is duplicated at the opposite side of the truck, as is usual in car truck construction.

Referring to the accompanying drawing, the side frame, indicated generally by the numeral 1, has an upper compression chord 2 and a lower tension chord 3 which connect the end portions of the frame in which journal boxes 4 are provided. The upper and lower chords 2 and 3 are connected intermediate their ends by integral upright columns 5 which are spaced apart to provide a central opening to receive the end of a truck bolster 6. The lower tension chord 3 is preferably of channel form with a bottom web 7 and side flanges 8 extending upwardly from the web 7. In the portion of the chord between the columns 5 the flanges 8 are extended laterally to provide horizontal seats 9. The laterally extended seating portions of the chord may be strengthened by suitable means such as integral gussets 10.

The vertical columns 5 may also be of channel form with webs 11 facing the bolster receiving opening and side flanges 12 extending from the web 11 toward the ends of the frame. In the lower portions thereof the webs 11 of the columns are provided with vertical slots 13. The bolster 6 is guided between the upper portions of the columns 5 and suitable means is provided for preventing tilting movements of the side frames with respect to the bolster. As herein shown, the bolster is provided with guide flanges 14 which overlie the inner and outer faces of the guide columns 5. Each end of the bolster 6 is supported upon suitable cushioning springs such as a nest of coil springs 15 which is interposed between the bolster and a spring plate 16 which is mounted in the side frame opening beneath the bolster. The spring plate 16 is of generally rectangular form to provide suitable seats for the supporting coil springs 15. As herein shown, five compression coil springs 15 are mounted upon the plate 16, the plate being provided with a circular flange 17 extending around the center of its upper face to provide a central spring seat 18 and with radial flanges 19 which provide spaces between them for the four remaining coil springs of the group.

The plate 16 is supported upon a carrier or supporting member 20 which is mounted in the side frame beneath the plate 16. The carrier 20 is of a width to be received between the side flanges 8 of the bottom chord and the plate 16 rests directly upon the central portion of the carrier, the plate being provided with integral downwardly projecting lugs 21 which project into sockets or apertures 22 in the carrier. The plate 16 is also provided with slots 23 which receive upwardly extending portions 24 of the carrier 20. The carrier 20 has end portions 25 extending laterally from the upwardly extending portions 24 and upwardly offset with respect to the central plate supporting portion thereof. The end portions 25 of the carrier extend through the vertical slots 13 of the guide columns and are provided with semi-bearings 26 which engage with caps 27 supported upon the upper ends of the compression coil springs 28 which are mounted in the channel of the bottom chord closely adjacent the outer sides of the webs 11 of the columns. The flanges 8 and 12 of the bottom chord and columns 5 provide housings or pockets for the springs 28.

The load carried by the bolster 6 is imposed upon the springs 15 and through the spring plate 16 and carrier 20 upon the coil springs 28, which normally support the spring plate 16 above the seats 9. The height of the portion of the carrier 20 beneath the plate 16 is such that the carrier 20 may be moved down into the channel of the bottom chord far enough to permit the plate 16 to rest upon the seats 9 of the bottom chord.

The springs 15 upon which the bolster rests are designed to cushion the loads up to the full capacity of the car, whereas the springs 28 are designed to cushion loads lighter than that of a heavily loaded car. When the car is empty or lightly loaded, the springs 28 are active and because of their greater deflection do most of the cushioning. When the load imposed upon the bolster is increased beyond a predetermined amount, the springs 28 are collapsed to an extent sufficient to permit the plate 16 to rest upon the seats 9, so that heavy loads are cushioned by the springs 15 only.

The truck is thus cushioned by a light set of springs when the car is lightly loaded, thereby giving the best possible ride under all conditions. Since the two sets of springs are in effect in series, the rate of deflection of the combination is such that a greater deflection is obtained from a given load, with the result that an easier ride is given to the load when both sets of springs are in action than would be given to a load by either set of springs acting alone.

Since under certain conditions of loading impacts may cause the plate 16 to bump against the seats 9, pads 29 of suitable cushioning material, such as fabric and rubber, may be provided on the seats 9.

The bolster supporting springs may be supported upon a spring plank 30 supported at its ends by the carrier member 20, as shown in Fig. 4 of the drawing. As shown in Fig. 4, a supporting plate 31 similar to the plate 16 is mounted upon the carrier 20 and is provided with lugs 32 which extend through apertures 33 in the spring plank to hold the spring plank in position.

Since the permissible overall height of a truck frame has already been established by the railroads, a problem is encountered in providing springs of sufficient strength in series without exceeding the height limitations. The present invention avoids this difficulty by the use of the U-shaped carrier which permits the tops of the lower springs 28 to be considerably above the bottoms of the upper springs 15. This construction makes it possible to approach a condition in which both sets of springs are seated near the same level even though the springs are disposed in series, so that little or no more vertical space is occupied by the springs than is required for a single set of springs.

It is to be understood that variations and modifications of the specific devices herein shown and described for purposes of illustration, may be made without departing from the spirit of the invention.

What I claim is:

1. A car truck having side frames, each comprising top and bottom chords and spaced columns connecting said chords and forming a central opening, said columns having vertical slots in the sides thereof facing said opening, a bolster having its ends guided for vertical movement in the openings of the side frame, a plate mounted in each side frame opening beneath the bolster, plate supporting members mounted for bodily movement vertically in said opening, said members underlying the plates and extending laterally through the slots of said columns, springs interposed between said plates and the ends of the bolster, and springs positioned outwardly of said columns and interposed between said laterally extending supporting members and the bottom chords of the side frames, the latter springs being of a size and capacity sufficient to normally support the plate and plate supporting members above and clear of the bottom chord.

2. A car truck having side frames, each comprising top and bottom chords and spaced columns connecting said chords and forming a central opening, said columns having vertical slots in the sides thereof facing said opening, a bolster having its ends guided for vertical movement in the openings of the side frame, a plate mounted in each side frame opening beneath the bolster, plate supporting members mounted for bodily movement vertically in said opening, said members underlying the plates and extending laterally through the slots of said columns, springs interposed between said plates and the ends of the bolster, and springs positioned outwardly of said columns and interposed between said laterally extending supporting members and the bottom chords of the side frames, the latter springs normally holding said plates spaced above the bottom chord but being compressible to permit said plates to seat upon the bottom chord upon the imposition of a predetermined load.

3. A car truck having side frames, each comprising top and bottom chords and spaced columns connecting the chords and forming therewith central openings in the side frames, each bottom chord being of channel form with a bottom web and upwardly extending side flanges, the side flanges being provided with laterally extending seating portions, said columns having vertical slots intermediate the inner and outer sides thereof, springs mounted in the bottom chord channel outwardly of said columns and adjacent thereto, a plate mounted for vertical movement in each side frame opening, each plate being of a width greater than the bottom chord, overlying said seating portions and engageable therewith, plate supporting members extending through said slots and yieldably supported upon said springs to normally support said plates clear of and above said seating portions, springs seated upon said plates, and a bolster having its ends extending into said side frame openings and supported upon said last mentioned springs.

4. A car truck having side frames, each comprising top and bottom chords and spaced columns connecting the chords and forming therewith central openings in the side frames, each bottom chord being of channel form with a bottom web and upwardly extending side flanges, the side flanges being provided with laterally extending seating portions, said columns having vertical slots intermediate the inner and outer sides thereof, springs mounted in the bottom chord channel outwardly of said columns and adjacent thereto, a plate mounted in each side frame opening, each plate being of a width greater than the bottom chord and overlying said seating portions, a supporting member for each plate guide for vertical movement in the channel of the bottom chord, said supporting member extending through said column slots and being supported upon said springs, springs seated upon said plates, and a bolster having its ends extending into said side frame openings and supported upon said last mentioned springs.

5. A car truck having a side frame comprising top and bottom chords and spaced columns connecting the chords and forming therewith a central opening in the side frame, the portion of the bottom chord at the bottom of said opening being of channel form with a bottom web and upwardly extending side flanges, said columns having vertical slots intermediate the inner and outer sides thereof, a vertically movable carrier member having a central horizontal supporting portion positioned between the bottom chord flanges, said horizontal portion being movable to a position in which its upper edge is at the level of the top edge of the bottom chord side flanges, said carrier member having upwardly offset end portions extending through said column slots, springs positioned outwardly of said columns and interposed between the ends of said carrier member and said bottom chord to normally support the horizontal portion of said carrier member above the web of the bottom chord, a plate supported upon the central portion of said carrier member and engageable with the flanges of the bottom chord upon compression of said springs, a bolster having an end guided for vertical movement in the side frame opening above said opening plate, and cushioning springs interposed between said bolster and plate.

6. A freight car truck having side frames, each comprising top and bottom chords and spaced columns connecting the chords and forming therewith central openings in the side frames, a bolster having its ends guided for vertical movements in said openings, a carrier member mountted in each of the side frames and guided by said columns for vertical movements in said opening, each carrier extending longitudinally of the frame and across the opening thereof beneath the bolster and past said columns, a plate supported by each carrier member within said openings, bolster supporting and cushioning springs interposed between the ends of the bolster and said plates, carrier supporting springs interposed between the portions of the carrier members extending past said columns and the bottom chords of the side frames, the latter springs being of a capacity to support said plates above the bottom chords under the weight of an empty or lightly loaded car, said carrier supporting springs being softer than the bolster supporting springs to effectively cushion the car when empty or lightly loaded.

HAROLD Y. CARPENTER.